United States Patent
Wu et al.

(10) Patent No.: US 10,630,353 B2
(45) Date of Patent: Apr. 21, 2020

(54) TWO-STAGE PRECODING METHOD AND APPARATUS

(71) Applicant: Huawei Technologies Co., Ltd., Shenzhen, Guangdong (CN)

(72) Inventors: Lu Wu, Shenzhen (CN); Yi Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/186,831

(22) Filed: Nov. 12, 2018

(65) Prior Publication Data

US 2019/0081669 A1    Mar. 14, 2019

Related U.S. Application Data

(63) Continuation of application No. PCT/CN2017/084184, filed on May 12, 2017.

(30) Foreign Application Priority Data

May 13, 2016   (CN) .......................... 2016 1 0323177

(51) Int. Cl.
   *H04B 7/02*      (2018.01)
   *H04B 7/0456*    (2017.01)
   (Continued)

(52) U.S. Cl.
   CPC ............. *H04B 7/0456* (2013.01); *H04B 7/04* (2013.01); *H04B 7/0452* (2013.01);
   (Continued)

(58) Field of Classification Search
   CPC ...... H04B 7/0456; H04B 7/0452; H04B 7/10; H04B 7/0417; H04B 7/0669; H04L 5/0048; H04L 25/0204; H04L 1/06; H04L 1/0618
   (Continued)

(56) References Cited

U.S. PATENT DOCUMENTS

| 2011/0194631 A1 | 8/2011 | Clerckx et al. |
| 2013/0088981 A1 | 4/2013 | Lv et al. |

(Continued)

FOREIGN PATENT DOCUMENTS

| CN | 101442351 A | 5/2009 |
| CN | 102299775 A | 12/2011 |

(Continued)

OTHER PUBLICATIONS

An Liu et al., "Phase Only RF Precoding for Massive MIMO Systems With Limited RF Chains", IEEE Transactions on Signal Processing; vol. 62, No. 17, Sep. 1, 2014, 11 pages.

(Continued)

*Primary Examiner* — Zewdu A Kassa
(74) *Attorney, Agent, or Firm* — Fish & Richardson P.C.

(57) ABSTRACT

This application relates to the field of wireless communications, and in particular, to a two-stage precoding technology and a channel information feedback technology in a wireless communications system. In a two-stage precoding method, a first network device sends a first reference signal for estimating spatial correlation matrix information by a second network device, and the first network device receives spatial correlation matrix information fed back by a user, and determines a stage-1 precoding matrix based on the spatial correlation matrix information. Solutions provided in this application are intended to improve performance of a two-stage precoding system by applying a two-stage precoding method that includes a spatial correlation matrix information feedback solution.

17 Claims, 7 Drawing Sheets

(51) Int. Cl.
  *H04B 7/06* (2006.01)
  *H04B 7/04* (2017.01)
  *H04B 7/0452* (2017.01)
  *H04B 7/10* (2017.01)
  *H04L 5/00* (2006.01)

(52) U.S. Cl.
  CPC ......... *H04B 7/0469* (2013.01); *H04B 7/0478* (2013.01); *H04B 7/06* (2013.01); *H04B 7/063* (2013.01); *H04B 7/10* (2013.01); *H04L 5/0048* (2013.01)

(58) Field of Classification Search
  USPC .......................... 375/267, 260, 259, 316, 295
  See application file for complete search history.

(56) References Cited

U.S. PATENT DOCUMENTS

| | | | |
|---|---|---|---|
| 2014/0133601 A1* | 5/2014 | Zhou | H04L 1/06 375/295 |
| 2017/0170880 A1 | 6/2017 | Wu et al. | |
| 2017/0180021 A1* | 6/2017 | Wang | H04B 17/309 |

FOREIGN PATENT DOCUMENTS

| | | |
|---|---|---|
| CN | 102725990 A | 10/2012 |
| CN | 105450343 A | 3/2016 |
| WO | 2009/128630 A1 | 10/2009 |

OTHER PUBLICATIONS

Jaehyun Park et al., "Multi-User Linear Precoding for Multi-Polarized Massive MIMO System Under Imperfect CSIT", IEEE Transactions on Wireless Communications; vol. 14, No. 5, May 2015,16 pages.

Alcatel-Lucent Shanghai Bell, Alcatel-Lucent, "Development of two-stage feedback framework for Rel-10", 3GPP TSG RAN WG1 #60bis Meeting, Beijing, China, Apr. 12-16, 2010, 5 pages, R1-101859.
Samsung, "Channel modeling for EB/FD MIMO", 3GPP TSG-RAN WG4 Meeting #78,St. Julian's, Malta, Feb. 15-19, 2016, 10 pages, R4-160069.

* cited by examiner

TWO-STAGE PRECODING METHOD AND APPARATUS

CROSS-REFERENCE TO RELATED APPLICATIONS

This application is a continuation of International Application No. PCT/CN2017/084184 filed on May 12, 2017, which claims priority to Chinese Patent Application No. 201610323177.4 filed on May 13, 2016. The disclosures of the aforementioned applications are hereby incorporated by reference in their entireties.

TECHNICAL FIELD

This application relates to the field of wireless communications, and in particular, to a two-stage precoding technology and a channel information feedback technology in a wireless communications system.

BACKGROUND

Massive MIMO (multiple-input multiple-output) is a key 5G (5th Generation) mobile communication technology recognized in the industry, and significantly improves spectral efficiency by using massive antennas. Because a future 5G system requires a low latency, high energy efficiency, high cost efficiency, and high spectral efficiency, if the massive MIMO uses a conventional precoding architecture in which precoding is implemented on a baseband and a quantity of intermediate radio frequency channels is the same as a quantity of transmit antennas, there may be very high baseband processing complexity and very high complexity and costs of intermediate radio frequency implementation. To resolve this problem, two-stage precoding becomes a research focus of the massive MIMO. Spatial dimension reduction is implemented by performing stage-1 precoding on an intermediate radio frequency, reducing complexity and costs, and a baseband performs stage-2 precoding to implement multi-user interference suppression. Most of existing two-stage precoding studies are focused on a system in which uplink-downlink channel reciprocity can be applied, for example, an LTE (long term evolution) TDD (time division duplex) system, where downlink channel information is estimated and obtained by using an uplink pilot signal. However, for a system in which an uplink and a downlink are in different frequency bands, for example, an LTE FDD (frequency division duplex) system, currently there is a lack of two-stage precoding solution, especially a channel information feedback solution in the two-stage precoding solution, that can be applied to a DBF (digital precoding or digital beamforming) hardware architecture or a fully connected two-stage HBF (hybrid analog and digital precoding or hybrid analog and digital beamforming) hardware architecture and that provides performance satisfying a system requirement. Therefore, there is a need for a two-stage precoding solution that includes a channel information feedback solution and provides relatively good performance when being applied to the DBF hardware architecture or the fully connected two-stage HBF hardware architecture.

SUMMARY

This application describes a two-stage precoding method, an apparatus, and a system, to improve performance of a two-stage precoding system by applying a two-stage precoding method that includes a spatial correlation matrix information feedback solution.

According to a first aspect, an embodiment of this application provides a two-stage precoding method. The method includes: sending, by a first network device, a first reference signal, where the first reference signal is used to estimate spatial correlation matrix information; receiving, by the first network device, spatial correlation matrix information sent by a second network device; and determining, by the first network device, a stage-1 precoding matrix based on the spatial correlation matrix information. The spatial correlation matrix is defined as $R=E(H^H H)$ where H is an M×N channel matrix, M is a quantity of receive antennas, and N is a quantity of transmit antennas. In a two-stage precoding system, the stage-1 precoding matrix is determined based on the spatial correlation matrix information fed back by the second network device. In comparison with using a specified stage-1 precoding matrix, cell-level spatial division may be more accurately and flexibly implemented based on spatial correlation information of all users in a cell, and a signal beam may adaptively point to one or more major user directions in the cell, thereby improving performance of the two-stage precoding system.

In a possible design, the first reference signal includes a group of reference signals sent on a horizontal antenna array and a group of reference signals sent on a vertical antenna array. Optionally, the group of reference signals sent on the horizontal antenna array and the group of reference signals sent on the vertical antenna array may be: a group of reference signals sent on $N_1$ antenna ports and a group of reference signals sent on $2N_2$ antenna ports, where $N_1$ is a quantity of antenna elements in a same polarization direction in each column of an antenna array, the $N_1$ antenna ports include $N_1$ antenna elements in a same polarization direction in a same column of the antenna array, $N_2$ is a column quantity of the antenna array, and the $2N_2$ antenna ports include $2N_2$ antenna elements in two polarization directions in a same row of the antenna array; or may be a group of reference signals sent on $2N_1$ antenna ports and a group of reference signals sent on $N_2$ antenna ports, where $N_1$ is a quantity of antenna elements in a same polarization direction in each column of an antenna array, the $2N_1$ antenna ports include $2N_1$ antenna elements in two polarization directions in a same column of the antenna array, $N_2$ is a column quantity of the antenna array, and the $N_2$ antenna ports include $N_2$ antenna elements in a same polarization direction in a same row of the antenna array. The second network device may separately measure a channel of the horizontal antenna array and a channel of the vertical antenna array based on the reference signals separately sent on the horizontal antenna array and the vertical antenna array, and quantize, based on estimated channel information, and feed back code words corresponding to channel correlation matrices in the foregoing two dimensions, so that the first network device can calculate a complete spatial correlation matrix based on the code words corresponding to the channel correlation matrices in the two dimensions. Optionally, the first network device may indicate, to the second network device by using signaling, a codebook that needs to be used to quantize a channel correlation matrix, and does not need to further notify the second network device whether currently sent reference signals are sent by using the horizontal antenna array or the vertical antenna array.

In another possible design, the first reference signal includes N/S groups of reference signals sent on S antenna ports, where N beam directions of the N/S groups of reference signals sent on the S antenna ports are orthogonal to each other, N is a quantity of antenna elements in an antenna array, S is a quantity of antenna ports, and S≤N. After the reference signals with the N orthogonal beam directions are sent, the second network device may measure a complete physical channel, and further estimate, quantize, and feed back the spatial correlation matrix information to the first network device. In addition, this manner of sending reference signals may also be applied to a DBF (digital precoding or digital beamforming) architecture and an HBF (hybrid analog and digital precoding or hybrid analog and digital beamforming) architecture, and may support use of a more flexible hardware architecture. Optionally, the first network device may indicate, to the second network device by using signaling, a weight value, a quantity N of antenna elements, a quantity $N_2$ of horizontal co-polarized antenna elements, and a quantity $N_1$ of vertical co-polarized antenna elements that are used to send the reference signals, so that the second network device estimates and quantizes the spatial correlation matrix, and feeds back the spatial correlation matrix information.

In a possible design, the spatial correlation matrix information includes a code word index of a first codebook and a code word index of a second codebook. In a specific design, the first network device calculates, by using a code word $\hat{R}_1$ of the first codebook and a code word $\hat{R}_2$ of the second codebook, a code word $\hat{R}=\hat{R}_1 \otimes \hat{R}_2$ of the spatial correlation matrix, where ⊗ means obtaining a Kronecker product of matrices.

In another possible design, the spatial correlation matrix information includes a code word index of the spatial correlation matrix. In a specific design, the first network device receives a code word index that is of the spatial correlation matrix and that is fed back by the second network device, and determines a code word $\hat{R}$ of the spatial correlation matrix from a spatial correlation matrix codebook based on the received code word index. A code word in the spatial correlation matrix codebook meets $\hat{R}=\hat{R}_1 \otimes \hat{R}_2$, where ⊗ means obtaining a Kronecker product of matrices, $\hat{R}_1$ is a code word of a first codebook, and $\hat{R}_2$ is a code word of a second codebook.

In a possible design, the code word $\hat{R}_1$ in the first codebook meets $\hat{R}_1=U(\rho_1, n_1)$ and $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1=\alpha_1 e^{j\theta_1}$, $(0 \leq \alpha_1 \leq 1, 0 \leq \theta_1 < 2\pi)$ represents a correlation coefficient of adjacent antenna elements in a single polarization antenna array in an antenna array, $n_1$ is a quantity of antenna elements in the single polarization antenna array, and the single polarization antenna array comprises antenna elements that are in a same row or a same column of the antenna array and that are in a same polarization direction.

In a possible design, the code word $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix},$$

where $$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2=\alpha_2 e^{j\theta_2}$, $(0 \leq \alpha_2 \leq 1, 0 \leq \theta_2 < 2\pi)$ represents a correlation coefficient of adjacent co-polarized antenna elements in a cross polarization antenna array in the antenna array, $\beta_1$, $\phi_1$, and $\beta_2$ represent correlation between antenna elements in two polarization directions, where $\beta_1 \geq 0$, $0 \leq \phi_1 < 2\pi$, and $\beta_2 > 0$, $n_2$ is a quantity of antenna elements in a same polarization direction in the cross polarization antenna array, and the cross polarization antenna array comprises antenna elements that are in a same row or a same column of the antenna array and that are in two polarization directions.

In a possible design, the two-stage precoding method further includes: sending, by the first network device, a second reference signal encoded by using the stage-1 precoding matrix, where the second reference signal is used to determine a stage-2 precoding matrix indicator; receiving, by the first network device, a stage-2 precoding matrix indicator sent by the second network device; determining, by the first network device, a stage-2 precoding matrix based on the received stage-2 precoding matrix indicator; performing, by the first network device, two-stage precoding on downlink data by using the stage-1 precoding matrix and the stage-2 precoding matrix; and sending, by the first network device, downlink data on which two-stage precoding is performed. It should be noted that the downlink data may include any type of information carried on a physical downlink channel, such as service information and control signaling, and this is not limited in this application.

In a possible design, the first network device sends stage-1 precoding matrix information to the second network device to determine the stage-2 precoding matrix indicator. Optionally, the first network device determines, from a stage-1 precoding codebook, a code word corresponding to the stage-1 precoding matrix; and the first network device sends, to the second network device, a code word index corresponding to the stage-1 precoding matrix, to determine the stage-2 precoding matrix indicator.

In a possible design, the first network device determines an equivalent channel correlation matrix $\hat{R}_{eff}=\hat{C}^H \hat{R} \hat{C}$ based on a code word $\hat{C}$ corresponding to the stage-1 precoding matrix and a code word $\hat{R}$ of a spatial correlation matrix, determines a code word W' based on the stage-2 precoding matrix indicator reported by the second network device, determines an adaptive code word of the second network device according to an adaptive codebook structure $\hat{W}=\hat{R}_{eff} W'$ that is based on the equivalent channel correlation matrix, and determines a final stage-2 precoding matrix based on adaptive code words of a plurality of second network devices. The equivalent channel refers to a channel matrix $H_{eff}=HC$ that is measured by the second network device and that includes the stage-1 precoding matrix, where H is a real channel matrix, and C is the stage-1 precoding matrix. Optionally, a codebook of the code word W' may be a DFT (discrete fourier transform) codebook or a codebook that is defined in the 3GPP (3rd Generation Partnership Project) TS 36.211 V13.1.0 protocol and that is used for PMI (precoding matrix indicator) feedback, or may be in another codebook form that can represent channel information. A correlation feature of a downlink equivalent channel may be more accurately described by defining the adaptive codebook structure $\hat{W}=\hat{R}_{eff}W'$ that is based on the equivalent channel correlation matrix, so as to improve accuracy of the stage-2 precoding matrix, thereby improving performance of the two-stage precoding system. Optionally, the first network device may indicate, to the second network device, whether a used adaptive codebook structure that is based on an equivalent channel correlation matrix uses the $\hat{W}=\hat{R}_{eff}W'$ form provided in this embodiment of this application.

In a possible design, the first network device determines an equivalent channel correlation matrix $\hat{R}_{eff}=\hat{C}^H\hat{R}C$ based on a stage-1 precoding matrix C and a code word $\hat{R}$ of a spatial correlation matrix, determines a code word W' based on the stage-2 precoding matrix indicator reported by the second network device, determines an adaptive code word of the second network device according to an adaptive codebook structure $\hat{W}=\hat{R}_{eff}W'$ that is based on the equivalent channel correlation matrix, and determines a final stage-2 precoding matrix based on adaptive code words of a plurality of second network devices.

In a possible design, a code word $\hat{C}$ in the stage-1 precoding codebook meets:

$\hat{C}=[v_1, v_2, \ldots, v_s]$, where $v_1$ to $v_s$ are column vectors in N×1 dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_s$ are column vectors in (N/S)×1 dimensions, where N is a quantity of antenna elements in an antenna array, S is a quantity of antenna ports, and S≤N. The two-stage precoding method provided in this embodiment of this application may be applied to different hardware architectures by using a code word form of the stage-1 precoding codebook provided in this embodiment of this application, and a hardware architecture with better performance, such as a DBF architecture or a fully connected HBF architecture, is further selected to improve performance of the two-stage precoding system. Optionally, the first network device may indicate to the second network device a code word type of the used stage-1 precoding codebook.

In a possible design, a feedback period of the spatial correlation matrix information is greater than a feedback period of the stage-2 precoding matrix indicator.

According to a second aspect, an embodiment of this application provides a two-stage precoding method. The method includes: receiving, by a second network device, a first reference signal sent by a first network device; estimating, by the second network device, spatial correlation matrix information based on the received first reference signal; and sending, by the second network device, the spatial correlation matrix information to the first network device.

In a possible design, the first reference signal includes a group of reference signals sent on a horizontal antenna array and a group of reference signals sent on a vertical antenna array. Optionally, the group of reference signals sent on the horizontal antenna array and the group of reference signals sent on the vertical antenna array may be: a group of reference signals sent on $N_1$ antenna ports and a group of reference signals sent on $2N_2$ antenna ports, where $N_1$ is a quantity of antenna elements in a same polarization direction in each column of an antenna array, the $N_1$ antenna ports include $N_1$ antenna elements in a same polarization direction in a same column of the antenna array, $N_2$ is a column quantity of the antenna array, and the $2N_2$ antenna ports include $2N_2$ antenna elements in two polarization directions in a same row of the antenna array; or may be a group of reference signals sent on $2N_1$ antenna ports and a group of reference signals sent on $N_2$ antenna ports, where $N_1$ is a quantity of antenna elements in a same polarization direction in each column of an antenna array, the $2N_1$ antenna ports include $2N_1$ antenna elements in two polarization directions in a same column of the antenna array, $N_2$ is a column quantity of the antenna array, and the $N_2$ antenna ports include $N_2$ antenna elements in a same polarization direction in a same row of the antenna array. The second network device may separately measure a channel of the horizontal antenna array and a channel of the vertical antenna array by receiving the reference signals separately sent on the horizontal antenna array and the vertical antenna array, and quantize, based on estimated channel information, and feed back code words corresponding to channel correlation matrices in the foregoing two dimensions, so that the first network device can calculate a complete spatial correlation matrix based on the code words corresponding to the channel correlation matrices in the two dimensions. Optionally, the second network device may further receive an indication from the first network device to learn of a codebook that needs to be used to quantize a channel correlation matrix, and does not need to learn whether currently received reference signals are sent by using the horizontal antenna array or the vertical antenna array.

In another possible design, the first reference signal includes N/S groups of reference signals sent on S antenna ports, where N beam directions of the N/S groups of reference signals sent on the S antenna ports are orthogonal to each other, N is a quantity of antenna elements in an antenna array, S is a quantity of antenna ports, and S≤N. After receiving the reference signals with the N orthogonal beam directions, the second network device may measure a complete physical channel, and further estimate, quantize, and feed back the spatial correlation matrix information to the first network device. In addition, this manner of sending reference signals may be applied to both a DBF architecture and an HBF architecture, and may support use of a more flexible hardware architecture. Optionally, the second network device may receive a weight value, a quantity N of antenna elements, a quantity $N_2$ of horizontal co-polarized antenna elements, and a quantity $N_1$ of vertical co-polarized antenna elements that are indicated by the first network device through signaling and that are used to send the reference signals, so that the second network device estimates and quantizes the spatial correlation matrix, and feeds back the spatial correlation matrix information.

In a possible design, the spatial correlation matrix information includes a code word index of a first codebook and a code word index of a second codebook. In a specific design, the second network device separately measures a channel of a horizontal antenna array and a channel of a vertical antenna array and corresponding channel correlation matrices based on the received reference signals, and then separately determines the code word index of the first codebook and the code word index of the second codebook with reference to corresponding codebooks. In another specific design, the second network device measures complete channel information and a spatial correlation matrix based on the received reference signals, and separately determines a code word of the first codebook and a code word of the second codebook based on a codebook structure $\hat{R}=\hat{R}_1 \otimes \hat{R}_2$ of the spatial correlation matrix, where $\otimes$ means obtaining a Kronecker product of matrices, $\hat{R}_1$ is the code word of the first codebook, and $\hat{R}_2$ is the code word of the second codebook.

In another possible design, the spatial correlation matrix information includes a code word index of a spatial correlation matrix. In a specific design, the second network device separately measures a channel of the horizontal antenna array and a channel of the vertical antenna array and corresponding channel correlation matrices based on the received reference signals, separately determines a code word index of a first codebook and a code word index of a second codebook with reference to corresponding codebooks, and determines the code word index of the spatial correlation matrix from a codebook of the spatial correlation matrix based on a code word structure $\hat{R}=\hat{R}_1 \otimes \hat{R}_2$ of the spatial correlation matrix, where $\otimes$ means obtaining a Kronecker product of matrices, $\hat{R}_1$ is a code word of the first codebook, and $\hat{R}_2$ is a code word of the second codebook. In another specific design, the second network device measures complete channel information and a spatial correlation matrix based on the received reference signals, and determines the code word index of the spatial correlation matrix.

In a possible design, the code word $\hat{R}_1$ in the first codebook meets $\hat{R}_1=U(\rho_0, n_1)$, and $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1=\alpha_1 e^{j\theta_1}$, $(0\leq\alpha_1\leq 1, 0\leq\theta_1<2\pi)$ represents a correlation coefficient of adjacent antenna elements in a single polarization antenna array in an antenna array, $n_1$ is a quantity of antenna elements in the single polarization antenna array, and the single polarization antenna array comprises antenna elements that are in a same row or a same column of the antenna array and that are in a same polarization direction.

In a possible design, a code word $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix},$$

where $$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2=\alpha_2 e^{j\theta_2}$, $(0\leq\alpha_2\leq 1, 0\leq\theta_2<2\pi)$ represents a correlation coefficient of adjacent co-polarized antenna elements in a cross polarization antenna array in the antenna array, $\beta_1$, $\phi_1$, and $\beta_2$ represent correlation between antenna elements in two polarization directions, where $\beta_1\geq 0$, $0\leq\phi_1<2\pi$, and $\beta_2>0$, $n_2$ is a quantity of antenna elements in a same polarization direction in the cross polarization antenna array, and the cross polarization antenna array comprises antenna elements that are in a same row or a same column of the antenna array and that are in two polarization directions.

In a possible design, the two-stage precoding method further includes: receiving, by the second network device, a second reference signal that is encoded by using the stage-1 precoding matrix and that is sent by the first network device; determining, by the second network device, a stage-2 precoding matrix indicator based on the second reference signal; sending, by the second network device, the stage-2 precoding matrix indicator to the first network device; and receiving, by the second network device, downlink data sent by the first network device and on which two-stage precoding is performed. It should be noted that the downlink data may include any type of information carried on a physical downlink channel, such as service information and control signaling, and this is not limited in this application.

In a possible design, the second network device receives a code word index that is corresponding to the stage-1 precoding matrix in a stage-1 precoding codebook and that is sent by the first network device; the second network device determines, based on the code word index corresponding to the stage-1 precoding matrix in the stage-1 precoding codebook, a code word corresponding to the stage-1 precoding matrix in the stage-1 precoding codebook; and the second network device determines the stage-2 precoding matrix indicator based on the second reference signal and the code word corresponding to the stage-1 precoding matrix in the stage-1 precoding codebook. In a specific design, the second network device determines an equivalent channel correlation matrix $\hat{R}_{eff}=\hat{C}^H\hat{R}\hat{C}$ based on a code word $\hat{C}$ corresponding to the stage-1 precoding matrix and a code word $\hat{R}$ of a spatial correlation matrix, determines a code word index of a code word W' based on the received second reference signal and according to an adaptive codebook structure $\hat{W}=\hat{R}_{eff}W'$ that is based on the equivalent channel correlation matrix, and sends, to the first network device, the code word index of the code word W' that is used as the stage-2 precoding matrix indicator. Optionally, a codebook of the code word W' may be a DFT (discrete fourier transform) codebook or a codebook that is defined in the 3GPP (3rd Generation Partnership Project) TS 36.211 V13.1.0 protocol and that is used for PMI (precoding matrix indicator) feedback, or may be in another codebook form that can represent channel information. A correlation feature of a downlink equivalent channel may be more accurately described by defining the adaptive codebook structure $\hat{W}=\hat{R}_{eff}W'$ that is based on the equivalent channel correlation matrix, so as to improve accuracy of the stage-2 precoding matrix, thereby improving performance of a two-stage precoding system. The equivalent channel correlation matrix does not need to be fed back when the better codebook structure $\hat{W}=\hat{R}_{eff}W'$ is applied, causing no further feedback overheads. Optionally, the second network device may receive an indication from the first network device, and determine, based on the indication, whether an adaptive codebook structure that is based on an equivalent channel correlation matrix uses the $\hat{W}=\hat{R}_{eff}W'$ form provided in this embodiment of this application.

In another possible design, the second network device estimates a code word corresponding to the stage-1 precoding matrix in a stage-1 precoding codebook; and the second network device determines the stage-2 precoding matrix indicator based on the second reference signal and the estimated code word corresponding to the stage-1 precoding matrix in the stage-1 precoding codebook. In a specific design, the second network device estimates, based on the received second reference signal and a code word $\hat{R}$ of a spatial correlation matrix, a code word $\hat{C}$ corresponding to the stage-1 precoding matrix in the stage-1 precoding codebook, determines an equivalent channel correlation matrix $\hat{R}_{eff}=\hat{C}^H\hat{R}\hat{C}$, determines a code word index of a code word W' based on the received second reference signal and according to an adaptive codebook structure $\hat{W}=\hat{R}_{eff}W'$ that is based on the equivalent channel correlation matrix, and sends, to the first network device, the code word index of the code word W' that is used as the stage-2 precoding matrix indicator.

In a possible design, a code word $\hat{C}$ in the stage-1 precoding codebook meets:

$\hat{C}=[v_1, v_2, \ldots, v_s]$, where $v_1$ to $v_s$ are column vectors in N×1 dimensions and are different from each other; or $$\hat{C} = \begin{bmatrix} v_1 & & & \\ & v_2 & & \\ & & \ddots & \\ & & & v_S \end{bmatrix},$$

where $v_1$ to $v_s$ are column vectors in (N/S)×1 dimensions, where N is a quantity of antenna elements in an antenna array, S is a quantity of antenna ports, and S≤N. The two-stage precoding method provided in this embodiment of this application may be applied to different hardware architectures by using a code word form of the stage-1 precoding codebook provided in this embodiment of this application, and a hardware architecture with better performance, such as a DBF architecture or a fully connected HBF architecture, is further selected to improve performance of the two-stage precoding system. Optionally, the second network device may receive an indication from the first network device, and selects a code word type of the used stage-1 precoding codebook based on the indication.

In a possible design, a feedback period of the spatial correlation matrix information is greater than a feedback period of the stage-2 precoding matrix indicator.

According to a third aspect, an embodiment of this application provides a first network device, and the first network device has a function of implementing behavior of the first network device in the foregoing method embodiment. The function may be implemented by using hardware, or may be implemented by executing corresponding software by hardware. The hardware or the software includes one or more modules corresponding to the function.

According to a fourth aspect, an embodiment of this application provides a second network device, and the second network device has a function of implementing behavior of the second network device in the foregoing method embodiment. The function may be implemented by using hardware, or may be implemented by executing corresponding software by hardware. The hardware or the software includes one or more modules corresponding to the function.

According to a fifth aspect, an embodiment of this application provides a first network device, where a structure of the first network device includes a transmitter, a receiver, and a processor. The transmitter and the receiver are configured to support communication between the first network device and a second network device. The transmitter is configured to send information or data related to the foregoing method to the second network device. The receiver is configured to support the first network device in receiving information or data that is related to the foregoing method and that is sent by the second network device. The processor is configured to support the first network device in performing a corresponding function in the foregoing method. In a possible design, the first network device may further include a memory. The memory is configured to be coupled to the processor, and store a program instruction and data that are necessary for the first network device. In a possible design, the first network device may further include an interface unit, configured to support communication between the first network device and another first network device, for example, communication between the first network device and a core network node.

According to a sixth aspect, an embodiment of this application provides a second network device, where a structure of the second network device includes a receiver, a transmitter, and a processor. The transmitter is configured to support the second network device in sending information or data related to the foregoing method to the first network device. The receiver is configured to support the second network device in receiving information or data that is related to the foregoing method and that is sent by the first network device. The processor is configured to support the second network device in performing a corresponding function in the foregoing method. In a possible design, the second network device may further include a memory. The memory is configured to be coupled to the processor, and store a program instruction and data that are necessary for the second network device.

According to a seventh aspect, an embodiment of this application provides a communications system, and the system includes the first network device and the second network device described in the foregoing aspects.

According to an eighth aspect, an embodiment of this application provides a computer storage medium, configured to store a computer software instruction used by the foregoing first network device. The computer storage medium includes a program designed to execute the foregoing aspects.

According to a ninth aspect, an embodiment of this application provides a computer storage medium, configured to store a computer software instruction used by the foregoing second network device. The computer storage medium includes a program designed to execute the foregoing aspects.

Compared with the prior art, the solutions provided in the embodiments of this application are intended to improve performance of the two-stage precoding system by applying the two-stage precoding method that includes the spatial correlation matrix information feedback solution.

BRIEF DESCRIPTION OF THE DRAWINGS

The following describes in more details the embodiments of this application with reference to accompanying drawings.

DETAILED DESCRIPTION

Network architectures and service scenarios described in embodiments of this application are intended to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application are also applicable to a similar technical problem.

A technology described in this application is applicable to an LTE (Long Term Evolution) system and a subsequent evolved system such as 5G (5th generation) mobile communication or other wireless communications systems using various radio access technologies, for example, systems using access technologies such as Code Division Multiple Access, Frequency Division Multiple Access, Time Division Multiple Access, orthogonal frequency division multiple access, and single carrier frequency division multiple access, and particularly applicable to a scenario in which a channel information feedback is required and/or a two-stage precoding technology needs to be applied, for example, a wireless network using a massive MIMO technology and a wireless network using a distributed antenna technology.

Figure 1:
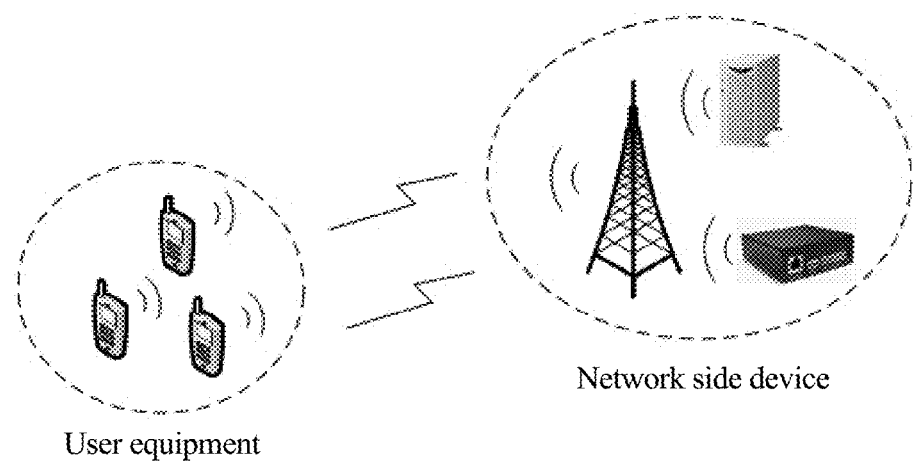
FIG. 1 is a schematic diagram of a possible application scenario according to this application.

As shown in FIG. 1, FIG. 1 is a schematic diagram of a possible application scenario according to this application. UE (user equipment) accesses a network side device by using a radio interface to perform communication, or may communicate with other user equipment, for example, communication in a D2D (device to device) scenario or an M2M (machine to machine) scenario. The network side device may communicate with the user equipment, or may communicate with another network side device, for example, communication between a macro base station and an access point. In this application, nouns "network" and "system" are usually interchangeably used, but meanings of the nouns may be understood by a person skilled in the art. The user equipment in this application may include a handheld device, an in-vehicle device, a wearable device, a computing device, or a control device that has a wireless communication function, or another processing device connected to a wireless modem; or user equipment (UE) in various forms, including a mobile station (MS), a terminal, terminal equipment, and the like. For ease of description, in this application, all the devices mentioned above are collectively referred to as user equipment (UE). The network side device in this application includes a base station (BS), a network controller, a mobile switching center, or the like. An apparatus that directly communicates with the user equipment by using a radio channel is usually a base station. The base station may include various forms such as a macro base station, a micro base station, a relay node, an access point, and a remote radio unit (RRU). Certainly, the apparatus that performs wireless communication with the user equipment may be another network side device that has a wireless communication function. This is not uniquely limited in this application. In systems that use different radio access technologies, names of devices that have a base station function may be different. For example, in an LTE network, the device is referred to as an evolved NodeB (eNB or eNodeB), and in a $3^{rd}$ generation ($3^{rd}$ Generation) network, the device is referred to as a NodeB (Node B). In this application, "precoding" and "beamforming" are collectively referred to as "precoding" because usually beamforming is essentially implemented through precoding, and a person skilled in the art may understand meanings thereof.

In the embodiments of the present invention, a network device (including a first network device and a second network device) includes the network side device and/or the user equipment in the foregoing wireless communications system. Optionally, the first network device may be a base station, and the second network device may be user equipment.

Figure 2A:
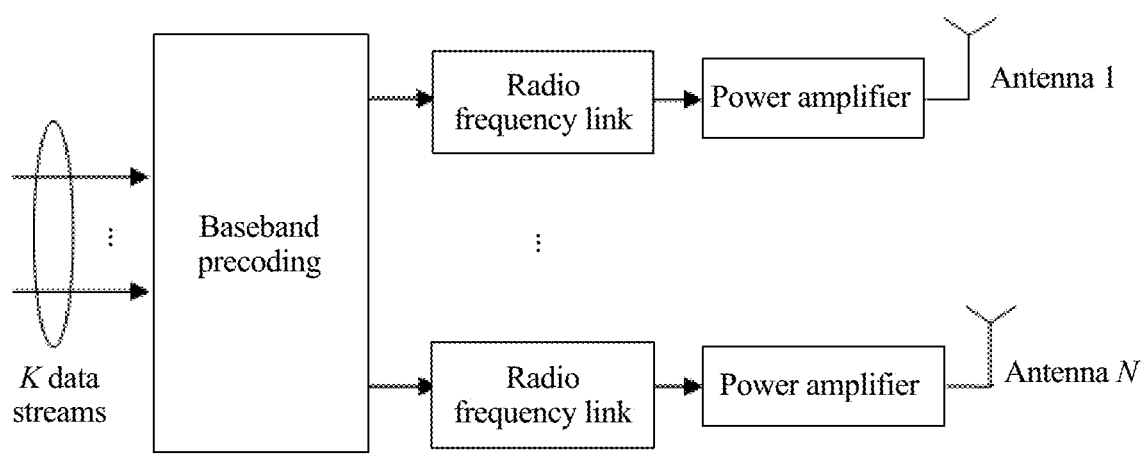
FIG. 2a is a schematic diagram of a possible architecture of a first network device according to this application.

FIG. 2a is a schematic diagram of a conventional DBF (digital precoding or digital beamforming) architecture according to this application. On a baseband, precoding processing is performed on K to-be-sent data streams to generate N signals to be sent on N antennas. The N signals are sent by using the N antennas after being processed by a radio frequency link and a power amplifier.

Figure 2B:
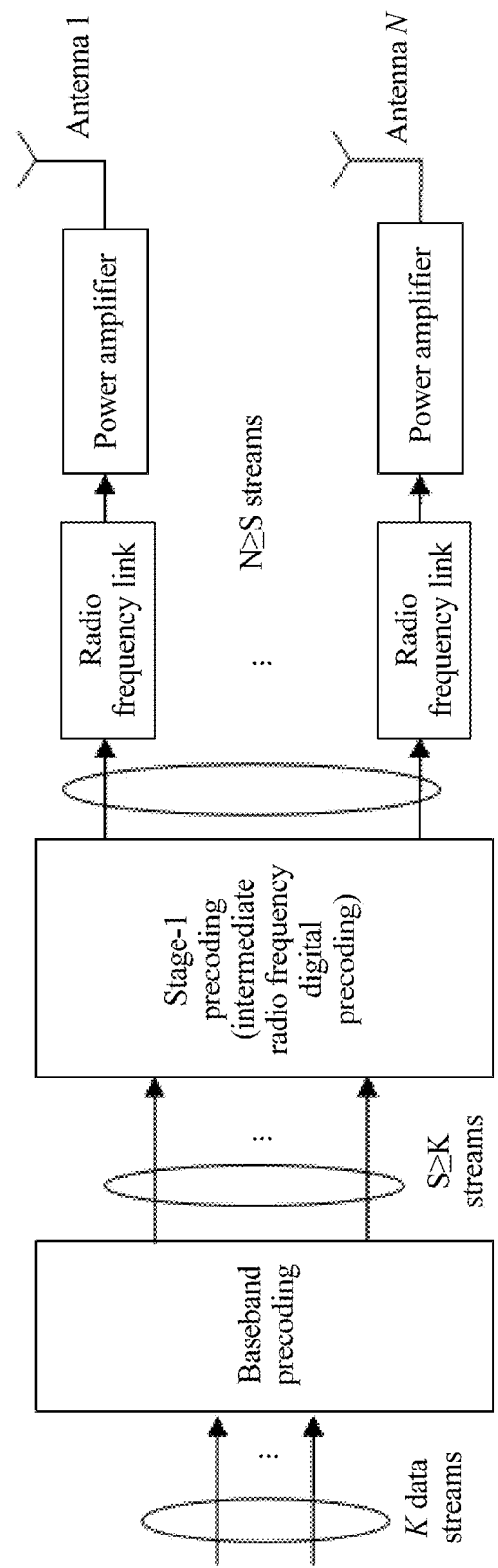
FIG. 2b is a schematic diagram of another possible architecture of a first network device according to this application.

FIG. 2b is a schematic diagram of a two-stage DBF architecture according to this application. On a baseband, stage-2 precoding is performed on K to-be-sent data streams to generate S data streams. Then, on an intermediate radio frequency, stage-1 precoding is performed on the data streams by using a digital precoding technology to generate N signals to be sent on N antennas, and then the N signals are sent by using the N antennas after being processed by a radio frequency link and a power amplifier.

Figure 2C:
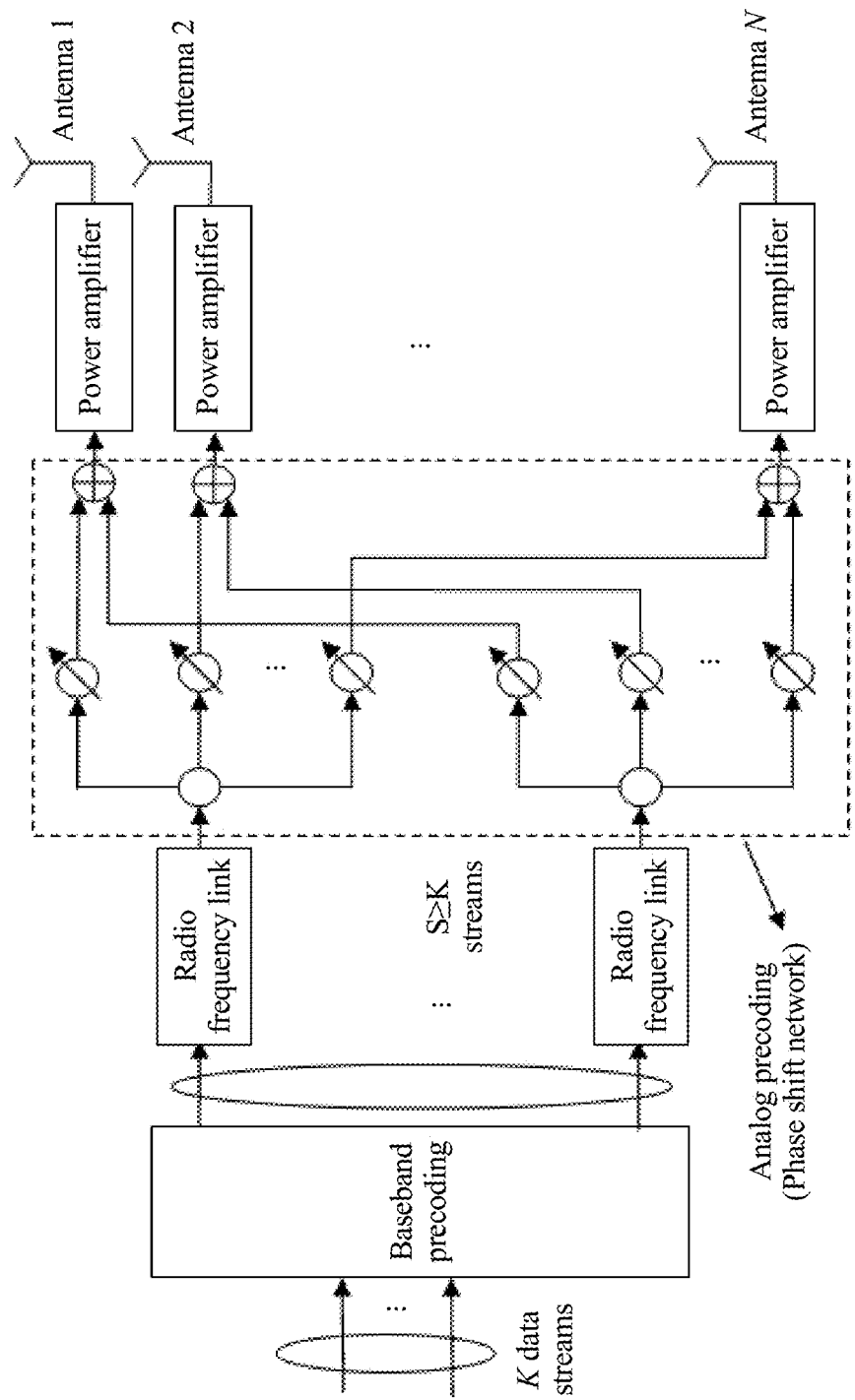
FIG. 2c is a schematic diagram of still another possible architecture of a first network device according to this application.
Figure 2D:
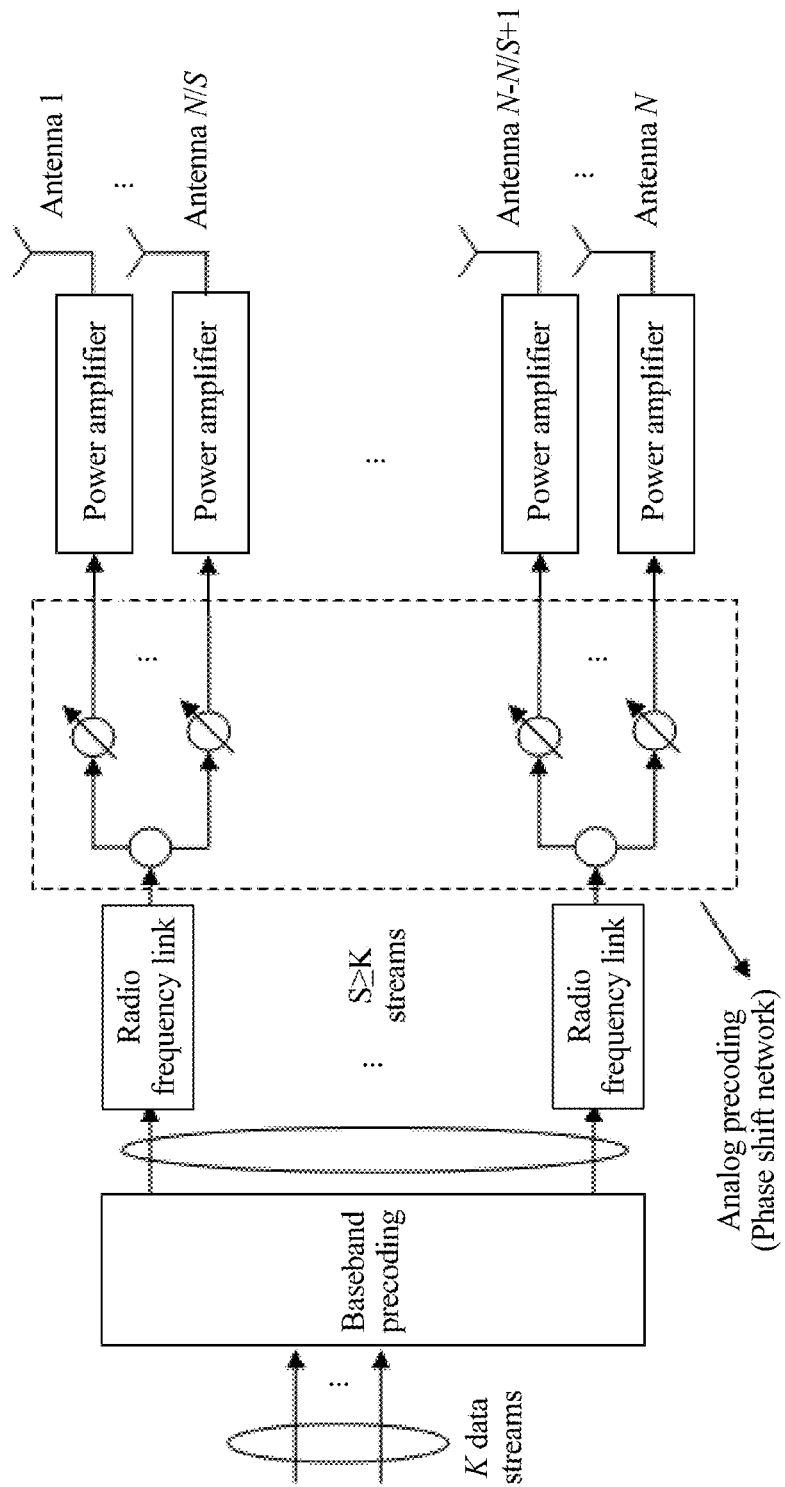
FIG. 2d is a schematic diagram of yet another possible architecture of a first network device according to this application.

FIG. 2c and FIG. 2d are schematic diagrams of a two-stage HBF (hybrid analog and digital precoding or hybrid analog and digital beamforming) architecture according to this application. On a baseband, stage-2 precoding is performed on K to-be-sent data streams to generate S data streams. Then, on an intermediate radio frequency, stage-1 precoding is performed on the data streams by using an analog precoding technology to generate N signals to be sent on N antennas, and then the N signals are sent by using the N antennas after being processed by a radio frequency link and a power amplifier. Analog precoding is completed by using a phase-shift network. A difference between FIG. 2c and FIG. 2d lies in that FIG. 2c is a fully connected architecture, and FIG. 2d is a partially connected architecture, where the fully connected architecture may form better beam pointing, and therefore performance of the fully connected architecture is superior to that of the partially connected structure.

Compared with the conventional DBF architecture shown in FIG. 2a, in the precoding architectures shown in FIG. 2b to FIG. 2d, because of simplification of baseband precoding processing and a reduction in intermediate radio frequency links, baseband computing and intermediate radio frequency costs may be reduced. The solutions provided in the embodiments of this application may be applied to any precoding architecture shown in FIG. 2a to FIG. 2d and may obtain better performance in comparison with an existing two-stage precoding technology. It may be understood that for clarity and convenience of description, FIG. 2a to FIG. 2d show only a structure and a data flow direction that are in a first network device and related to two-stage precoding, and the first network device may further have another structure and/or a data stream processing capability for implementing a function of the first network device, and this is not limited in this application. It should be noted that the solutions provided in the embodiments of this application may be further applied to another possible architecture of the first network device, and this is not limited in this application.

Figure 3:
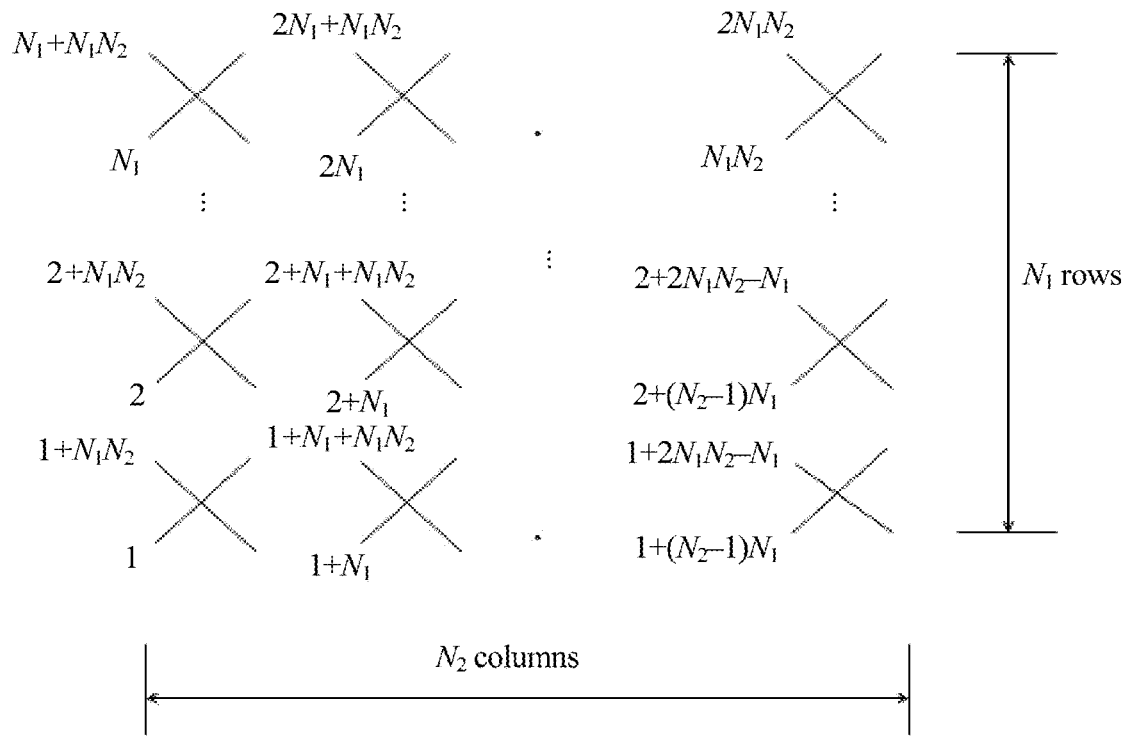
FIG. 3 is a schematic diagram of a possible rectangular antenna array according to this application.

FIG. 3 is a schematic diagram of a possible rectangular antenna array according to this application.

Usually, a 2D planar uniformly spaced antenna array structure is described in a ($N_1$, $N_2$, P) form, where $N_1$ is a quantity of antenna elements in a same polarization direction in each column of an antenna array, $N_2$ is a column quantity of the antenna array, and P is a polarization direction quantity. FIG. 3 specifically shows a rectangular uniformly spaced cross-polarization antenna array ($N_1$, $N_2$, 2) whose polarization direction quantity is 2. In the figure, a mathematical expression alongside each antenna element is a serial number of the antenna element, and a total quantity of antenna elements is $N=2N_1N_2$. In this application, a noun "antenna" is frequently used to describe the "antenna element" in the antenna array. However, a person skilled in the art can understand a meaning thereof.

For ease of description and understanding, unless otherwise specified, all the embodiments in this application are described based on the antenna array shown in FIG. 3. In addition, unless otherwise specified, in a two-stage precoding method in this application, C indicates a stage-1 precoding matrix, W represents a stage-2 precoding matrix, N is a quantity of antenna elements in an antenna array, S is a quantity of antenna ports, and $S \leq N$. It should be noted that the embodiments provided in this application may be further applied to a system using an antenna array of another form, for example, a single polarization antenna array. This is not limited in this application.

The embodiments of this application provide a two-stage precoding scheme that includes a spatial correlation matrix information feedback solution, improving performance of a two-stage precoding system. The embodiments of this application are further described in detail below based on a common aspect of this application described above.

Figure 4:
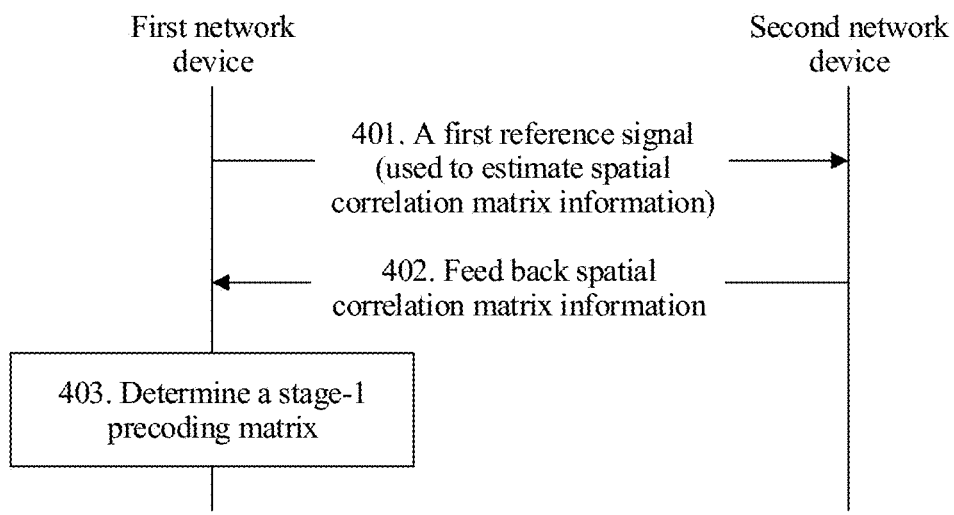
FIG. 4 is a schematic flowchart of a two-stage precoding method according to an embodiment of this application.

FIG. 4 is a schematic flowchart of a two-stage precoding method according to an embodiment of this application.

In part 401, a first network device sends a first reference signal to a second network device to estimate spatial correlation matrix information.

In an example, the first network device configures a reference signal that can be used to estimate spatial correlation matrix information, and sends the reference signal to the second network device. For example, the first network device may send a plurality of groups of reference signals on different antenna ports based on a structure characteristic of the antenna array, so that the second network device measures, based on the received reference signals, channels corresponding to the different antenna ports and calculates channel correlation matrices. For another example, the first network device may send a plurality of groups of reference signals on a same antenna port or different antenna ports, and ensure that a plurality of beams used to send the reference signals are orthogonal to each other, so that the second network device measures spatial correlation matrices based on the received reference signals. A specific form of the reference signal may be agreed in advance, for example, a CSI RS (channel state information reference signal) defined in the 3GPP (3rd Generation Partnership Project) TS 36.211 V13.1.0 protocol or another reference signal that can meet a requirement is used. This is not limited in this application.

In part 402, the second network device feeds back spatial correlation matrix information to the first network device.

In an example, the second network device performs channel measurement based on the received reference signals, and feeds back the spatial correlation matrix information to the first network device based on a channel measurement result. Optionally, the spatial correlation matrix information may be channel correlation matrix information decomposed into different dimensions, for example, code word indexes indicating channel correlation matrices in different dimensions, or may be a code word index directly indicating a spatial correlation matrix.

In part 403, the first network device determines a stage-1 precoding matrix based on the spatial correlation matrix information fed back by the second network device.

In an example, the first network device may determine the stage-1 precoding matrix based on spatial correlation matrix information fed back by all second network devices in an area (for example, a cell) served by the first network device. Optionally, the first network device may calculate the stage-1 precoding matrix according to a capacity maximization criterion and based on the spatial correlation matrix information of all the second network devices.

Determining the stage-1 precoding matrix based on the spatial correlation matrix information fed back by the second network device can more flexibly and accurately implement cell-level spatial division, and adaptively enable a signal beam to point to one or more major user directions in a cell, thereby improving performance of a two-stage precoding system. In addition, a flexible manner of sending the first reference signal may adapt to different hardware structures (such as a DBF architecture, a fully connected HBF architecture, and a partially connected HBF architecture), so that the two-stage precoding system can have better performance in different hardware structures. A person skilled in the art may understand that in addition to the two-stage precoding system, a channel feedback solution provided in this application, for example, the foregoing embodiment corresponding to FIG. 4, may be applied to another system in which user channel information needs to be fed back. This is not limited in this application.

Figure 5:
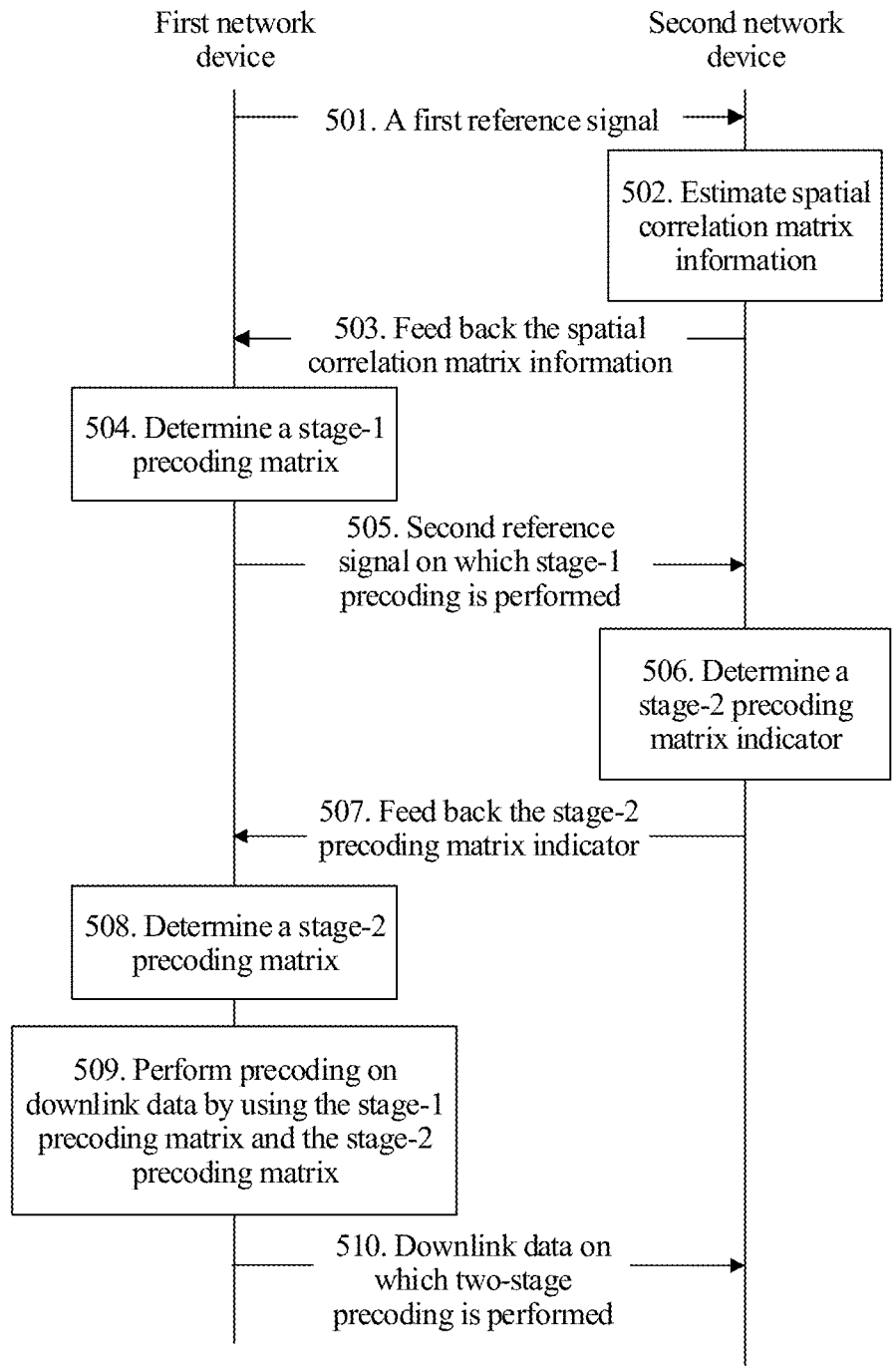
FIG. 5 is a schematic flowchart of another two-stage precoding method according to an embodiment of this application.

With reference to FIG. 5, the following describes in detail the solutions provided in the embodiments of this application.

In part 501, a first network device sends a first reference signal to a second network device to estimate spatial correlation matrix information.

In an example, the first reference signal sent by the first network device include: a group of reference signals sent on $N_1$ antenna ports and a group of reference signals sent on $2N_2$ antenna ports, where $N_1$ is a quantity of antenna elements in a same polarization direction in each column of an antenna array, the $N_1$ antenna ports include $N_1$ antenna elements in a same polarization direction in a same column of the antenna array, $N_2$ is a column quantity of the antenna array, and the $2N_2$ antenna ports include $2N_2$ antenna elements in two polarization directions in a same row of the antenna array.

Specifically, with reference to the antenna array shown in FIG. 3, the first network device first configures and sends the group of reference signals sent on the $N_1$ antenna ports to measure a vertical antenna array channel, where an encoding matrix of the group of reference signals is set to:

$$C' = \begin{bmatrix} I_{N_1 \times N_1} \\ O_{(N-N_1) \times (S-N_1)} \end{bmatrix},$$

where $I_{N_1 \times N_1}$ is an $N_1 \times N_1$ identity matrix, and $O_{(N-N_1) \times (S-N_1)}$ is $(N-N_1) \times (S-N_1)$ an all-zero matrix, where the $N_1$ ports are respectively connected to vertical antenna elements 1 to $N_1$. N is a quantity of antenna elements in the antenna array, where $N=2N_1N_2$, and S is a quantity of antenna ports, where $S \leq N$.

The first network device further configures and sends the reference signals sent on the $2N_2$ antenna ports to measure a horizontal antenna channel. An encoding matrix C" of this group of reference signals is a matrix whose elements in (row $1+iN_1$, column $i+1$) and (row $1+N_1N_2+iN_1$, column $N_2+i+1$) are 1 and whose element in a remaining location is 0, where $i=0,1, \ldots, N_2-1$, so that the $2N_2$ ports are respectively connected to horizontal antenna elements 1, $1+N_1, \ldots, 1+(N_2-1)N_1, 1+N_1N_2, 1+N_1N_2+N_1, \ldots, 1+N_1N_2+(N_2-1)N_1$.

In another example, the first reference signal sent by the first network device include: a group of reference signals sent on $2N_1$ antenna ports and a group of reference signals sent on $N_2$ antenna ports, where $N_1$ is a quantity of antenna elements in a same polarization direction in each column of an antenna array, the $2N_1$ antenna ports include $2N_1$ antenna elements in two polarization directions in a same column of the antenna array, $N_2$ is a column quantity of the antenna array, and the $N_2$ antenna ports include $N_2$ antenna elements in a same polarization direction in a same row of the antenna array. A specific configuration and sending manner or process is similar to that described in the foregoing example, and a difference lies in that in this example, for the group of reference signals, $2N_1$ dual polarization antenna ports are selected to measure a vertical antenna array channel, $N_1$ single polarization antenna ports are selected to measure a horizontal antenna array channel, and non-zero elements in C' and C" in this embodiment are correspondingly selected according to a rule in the foregoing example.

In still another example, the first reference signal sent by the first network device include N/S groups of reference signals sent on S antenna ports, where N beam directions of the N/S groups of reference signals sent on the S antenna ports are orthogonal to each other, N is a quantity of antenna elements in an antenna array, S is a quantity of antenna ports, and $S \leq N$. Specifically, the first network device configures and sends N/S groups of precoded reference signals that are sent on the S antenna ports, to estimate a complete actual physical channel. Estimating a complete actual M×N-dimensional physical channel H requires sending of the N/S groups of reference signals that are sent on the S antenna ports, and requires that N beams are orthogonal to each other, where M is a quantity of user receive antennas. This manner of sending reference signals may be applied to both a DBF architecture and an HBF architecture, and support use of a more flexible hardware architecture.

In part 502, the second network device estimates spatial correlation matrix information based on the received reference signals.

In an example, the second network device receives the first reference signal that is sent by the first network device and that include a group of reference signals sent on $N_1$ antenna ports and a group of reference signals sent on $2N_2$ antenna ports. For specific configuration and sending manners, refer to the example description in part 501, and details are not described herein again.

The second network device measures an $M \times N_1$-dimensional vertical antenna array channel $H_1$ based on the reference signals sent on the $N_1$ antenna ports, to estimate an $N_1 \times N_1$ vertical channel correlation matrix $R_1 = E(H_1^H H_1)$, where M is a quantity of user receive antennas. Then, an optimal code word $\hat{R}_1$ in a first codebook $\Theta_1$ is selected. Optionally, the optimal code word $\hat{R}_1$ in the first codebook $\Theta_1$ may be selected according to a minimum distance criterion represented by the following formula:

$$\hat{R}_1 = \underset{A \in \Theta_1}{\arg\min} \frac{|\text{trace}(R_1 A^H)|}{\|R_1\| \|A\|}$$

Alternatively, the selection may be performed according to another criterion. This is not limited in this application.

The second network device estimates an $M \times 2N_2$-dimensional horizontal antenna array channel $H_2$ based on the reference signals sent on the $2N_2$ antenna ports, to estimate a $2N_2 \times 2N_2$ horizontal channel correlation matrix $R_2 = E(H_2^H H_2)$. Then, an optimal code word $\hat{R}_2$ in a second codebook is selected. Optionally, the optimal code word $\hat{R}_2$ in the second codebook may be selected according to a minimum distance criterion or another criterion. This is not limited in this application.

In an example, a code word in the first codebook is designed as an $n_1 \times n_1$ Hermitian matrix:

$$\hat{R}_1 = U(\rho_1, n_1), \text{ where}$$

$$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

where $\rho_1 = \alpha_1 e^{j\theta_1}$, $(0 \leq \alpha_1 \leq 1, 0 \leq \theta_1 < 2\pi)$ represents a correlation coefficient of adjacent antenna elements in a single polarization antenna array in an antenna array, $n_1$ is a quantity of antenna elements in the single polarization antenna array, and the single polarization antenna array comprises antenna elements that are in a same row or a same column of the antenna array and that are in a same polarization direction. Specifically, with reference to the foregoing example, the first codebook may be understood as a vertical channel correlation matrix codebook, where $n_1 = N_1$.

In an example, a code word in the second codebook is designed as an $n_2 \times n_2$ Hermitian matrix:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix},$$

where $$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

where $\rho_2 = \alpha_2 e^{j\theta_2}$, $(0 \leq \alpha_2 \leq 1, 0 \leq \theta_2 < 2\pi)$ represents a correlation coefficient of adjacent co-polarized antenna elements in a cross polarization antenna array in the antenna array, $\beta_1$, $\phi_1$, and $\beta_2$ represent correlation between antenna elements in two polarization directions, where $\beta_1 \geq 0$, $0 \leq \phi_1 < 2\pi$, and $\beta_2 > 0$, $n_2$ is a quantity of antenna elements in a same polarization direction in the cross polarization antenna array, and the cross polarization antenna array comprises antenna elements that are in a same row or a same column of the antenna array and that are in two polarization directions. Specifically, with reference to the foregoing example, the second codebook may be understood as a horizontal channel correlation matrix codebook, where $n_2 = 2N_2$.

Optionally, the first network device may indicate, to the second network device by using signaling, a codebook that needs to be used to quantize a channel correlation matrix, and does not need to notify the second network device whether currently sent reference signals are sent by using a horizontal antenna array or a vertical antenna array. For example, the first network device indicates, to the second network device by using 1-bit RRC (radio resource control) higher layer signaling, a codebook type used by each group of reference signals, for example, '0' means using the first codebook, and '1' means using the second codebook.

In an example, the second network device receives the first reference signal that is sent by the first network device and that include a group of reference signals sent on $2N_1$ antenna ports and a group of reference signals sent on $N_2$ antenna ports. For specific configuration and sending manners, refer to the example description in part 501, and details are not described herein again. A method for and a process of estimating the spatial correlation matrix information by the second network device and designs of the first codebook and the second codebook are similar to those in the foregoing example, and details are not described herein again. However, a difference lies in that in this example, a vertical antenna array channel correlation matrix estimated based on the reference signals sent on the $2N_1$ antenna ports uses the second codebook and $n_2 = 2N_1$, and a horizontal antenna array channel correlation matrix estimated based on the reference signals sent on the $N_2$ antenna ports uses the first codebook and $n_1 = N_2$.

Particularly, in an example, when the first network device uses single polarization antenna arrays, both a horizontal antenna array and a vertical antenna array are single polarization antenna arrays. In this case, the solution provided in this embodiment of this application may still be applied, but a difference lies in that both a horizontal antenna array channel correlation matrix and a vertical antenna array channel correlation matrix are quantized by using the foregoing first codebook.

In still another example, the second network device receives N/S groups of reference signals sent by the first network device on S antenna ports, where N beam directions of the N/S groups of reference signals sent on the S antenna ports are orthogonal to each other, N is a quantity of antenna elements in an antenna array, S is a quantity of antenna ports, and $S \leq N$. For specific configuration and sending manners, refer to the example description in part 501, and details are not described herein again.

The second network device estimates N/S groups of M×S-dimensional channels based on the received N/S groups of reference signals, to obtain a complete actual M×N-dimensional physical channel H, estimate an N×N spatial correlation matrix $R = E(H^H H)$, and then select an optimal code word $\hat{R}$ in a spatial correlation matrix codebook. Optionally, the optimal code word $\hat{R}$ in the spatial correlation matrix codebook may be selected according to a minimum distance criterion or another criterion. This is not limited in this application. In a specific example, the first network device indicates, to a user, a transmit beam weight value, a quantity N of transmit antenna elements, a quantity $N_2$ of horizontal co-polarized antenna elements, and a quantity $N_1$ of vertical co-polarized antenna elements that are of the N/S groups of reference signals sent on the S antenna ports, so that the second network device uses them to estimate the channel H and determine the optimal code word $\hat{R}$ in the spatial correlation matrix codebook.

In an example, the spatial correlation matrix codebook is designed as a Kronecker product of the first codebook and the second codebook, that is, $\hat{R} = \hat{R}_2 \otimes \hat{R}_1$, where designs of the codebook $\hat{R}_1$ and the codebook $\hat{R}_2$ are the same as those in the foregoing example description.

Particularly, in an example, when this embodiment of this application is applied to a distributed antenna system, each RRU (remote radio unit) may obtain a code word $\hat{R}_i$ (where subscript i indicates code words that are of spatial correlation matrices and that are fed back by different RRUs) of a spatial correlation matrix of the RRU according to the foregoing embodiment. For the entire distributed antenna system, a code word $\hat{R}$ of a spatial correlation matrix of the distributed antenna system is a Hermitian matrix that is of a block diagonal structure and that includes all of the foregoing $\hat{R}_i$.

In part 503, the second network device feeds back the spatial correlation matrix information to the first network device.

In an example, the spatial correlation matrix information includes a code word index of a first codebook and a code word index of a second codebook. In a specific example, the second network device determines code word indexes of the first codebook and the second codebook through channel measurement in different dimensions, and feeds back the code word indexes to the first network device. In another specific example, the second network device measures complete channel information and a code word $\hat{R}$ of a spatial correlation matrix, and determines the code word indexes of the first codebook and the second codebook according to $\hat{R} = \hat{R}_1 \otimes \hat{R}_2$ and feeds back the code word indexes to the first network device. The first network device determines code words of the first codebook and the second codebook based on the code word indexes of the first codebook and the second codebook, and then determines the code word of the spatial correlation matrix according to $\hat{R} = \hat{R}_1 \otimes \hat{R}_2$.

In another example, the spatial correlation matrix information includes a code word index of a spatial correlation matrix. In a specific example, the second network device determines code words of a first codebook and a second codebook through channel measurement in different dimensions, and determines the code word index of the spatial correlation matrix according to $\hat{R} = \hat{R}_1 \otimes \hat{R}_2$, and feeds back the code word index to the first network device. In another specific example, the second network device measures complete channel information and a code word $\hat{R}$ of the spatial correlation matrix, and feeds back the code word index of the spatial correlation matrix to the first network device. The first network device determines the code word of the spatial correlation matrix based on the code word index of the spatial correlation matrix.

In part 504, the first network device determines a stage-1 precoding matrix based on the spatial correlation matrix information fed back by the second network device.

In an example, the first network device may determine the stage-1 precoding matrix based on spatial correlation matrix information fed back by all second network devices in an area (for example, a cell) served by the first network device. Optionally, the first network device may calculate the stage-1 precoding matrix according to a capacity maximization criterion and based on the spatial correlation matrix information of all the second network devices.

Optionally, the stage-1 precoding matrix determined by the first network device may be directly obtained through calculation based on the spatial correlation matrix information, or may be obtained through calculation and quantization based on the spatial correlation matrix information. For example, an optimal code word in a stage-1 precoding codebook is selected as the stage-1 precoding matrix based on a calculation result.

In part 505, the first network device sends, to the second network device, a second reference signal on which stage-1 precoding is performed. The second reference signal is used to determine a stage-2 precoding matrix indicator. A specific form of the second reference signal may be agreed in advance, for example, a CSI RS defined in the 3GPP TS 36.211 V13.1.0 protocol or another reference signal that can meet a requirement is used. This is not limited in this application.

In part 506, the second network device determines a stage-2 precoding matrix indicator based on the received second reference signal.

In an example, the second network device may determine the stage-2 precoding matrix indicator by using a solution in the prior art. For example, a technical solution for determining a stage-2 precoding matrix indicator in an existing LTE system may be used to select a specific code word from a codebook that is defined in the 3GPP TS 36.211 V13.1.0 protocol and that is used for PMI (precoding matrix indicator) feedback, and determine the stage-2 precoding matrix indicator.

In an example, the second network device determines the stage-2 precoding matrix indicator with reference to an equivalent channel correlation matrix and the second reference signal.

In an example, an adaptive codebook structure that is based on an equivalent channel correlation matrix is a product of an equivalent channel correlation matrix $\hat{R}_{eff}$ and a predefined codebook W', that is, $\hat{W}=\hat{R}_{eff}W'$. Optionally, a codebook of the code word W' may be a DFT (discrete fourier transform) codebook or the codebook that is defined in the 3GPP TS 36.211 V13.1.0 protocol and that is used for PMI (precoding matrix indicator) feedback, or may be in another codebook form that can represent channel information. A correlation feature of a downlink equivalent channel may be more accurately described by defining the adaptive codebook structure $\hat{W}=\hat{R}_{eff}W'$ that is based on the equivalent channel correlation matrix, so as to improve accuracy of the stage-2 precoding matrix, thereby improving performance of a two-stage precoding system. Optionally, the second network device may receive an indication from the first network device, and determine, based on the indication, whether an adaptive codebook structure that is based on an equivalent channel correlation matrix uses the $\hat{W}=\hat{R}_{eff}W'$ form provided in this embodiment of this application. For example, the first network device indicates, to the second network device by using 1-bit RRC (radio resource control) higher layer signaling, the adaptive codebook structure that is based on the equivalent channel correlation matrix, for example, '0' means using a codebook defined in a current 3GPP protocol, that is, $\hat{w}=w'$; and '1' means using an adaptive codebook that is based on an equivalent channel correlation matrix and that uses the $\hat{W}=\hat{R}_{eff}W'$ form.

In an example, the first network device sends stage-1 precoding matrix information to the second network device to determine the stage-2 precoding matrix indicator. Optionally, the first network device determines, from the stage-1 precoding codebook, a code word corresponding to the stage-1 precoding matrix; the first network device sends, to the second network device, a code word index corresponding to the stage-1 precoding matrix; the second network device receives a code word index that is corresponding to the stage-1 precoding matrix in the stage-1 precoding codebook and that is sent by the first network device; the second network device determines, based on the code word index corresponding to the stage-1 precoding matrix in the stage-1 precoding codebook, a code word corresponding to the stage-1 precoding matrix in the stage-1 precoding codebook; and the second network device determines the stage-2 precoding matrix indicator based on the second reference signal and the code word corresponding to the stage-1 precoding matrix in the stage-1 precoding codebook.

In a specific example, both the first network device and the second network device calculate an equivalent channel correlation matrix $\hat{R}_{eff}=\hat{C}^H\hat{R}\hat{C}=\hat{C}^H(\hat{R}_2\otimes\hat{R}_1)\hat{C}$ based on a code word $\hat{C}$ corresponding to the stage-1 precoding matrix in the stage-1 precoding codebook and the code word $\hat{R}$ that is of the spatial correlation matrix and that is obtained in part 502 or the code words that are of the first codebook and the second codebook and that are obtained in part 502. The second network device determines, based on the received second reference signal and the equivalent channel correlation matrix, a rank r (Rank) and a code word W' that is in a codebook, that is corresponding to the rank r, and that represents a short-time narrowband channel characteristic, and feeds back a code word index of W' as the stage-2 precoding matrix indicator to the first network device. Optionally, the stage-2 precoding matrix indicator may be fed back to the first network device together with channel information such as an RI (rank indication) and/or a CQI (channel quality indicator).

In another example, the second network device estimates a code word corresponding to the stage-1 precoding matrix in the stage-1 precoding codebook; and the second network device determines the stage-2 precoding matrix indicator based on the second reference signal and the estimated code word corresponding to the stage-1 precoding matrix in the stage-1 precoding codebook.

In a specific example, the second network device estimates an unquantized equivalent channel correlation matrix $R_{eff}=E(H_{eff}^H H_{eff})$ based on a measured equivalent channel $H_{eff}$, and then estimates a code word $\hat{C}$ corresponding to the stage-1 precoding matrix in a stage-1 precoding codebook $\Omega$. Optionally, the code word $\hat{C}$ corresponding to the stage-1 precoding matrix may be estimated according to a minimum distance criterion or another criterion. This is not limited in this application. The following describes in detail a manner of estimating $\hat{C}$ according to the minimum distance criterion.

According to the specific example in part 502, when the second network device can learn of a code word $\hat{R}=\hat{R}_1 \otimes \hat{R}_1$ of a quantized spatial correlation matrix, $\hat{C}$ may be estimated according to the following formula:

$$\hat{C} = \underset{B \in \Omega}{\operatorname{argmin}} \frac{\left|\operatorname{trace}\left(R_{e\!f\!f}\left(B^H \hat{R} B\right)^H\right)\right|}{\|R_{e\!f\!f}\| \|B^H \hat{R} B\|}$$

An expression on the right of an equal sign in the formula means searching the codebook $\Omega$ for a code word B that minimizes a value of $$\frac{\left|\operatorname{trace}\left(R_{e\!f\!f}\left(B^H \hat{R} B\right)^H\right)\right|}{\|R_{e\!f\!f}\| \|B^H \hat{R} B\|},$$

where trace( ) means calculating a trace of a matrix in the brackets.

According to the specific example in part 502, when the second network device can learn of an unquantized spatial correlation matrix R, $\hat{C}$ may be estimated according to the following formula:

$$\hat{C} = \underset{D \in \Omega}{\operatorname{argmin}} \frac{\left|\operatorname{trace}\left(R_{e\!f\!f}(D^H R D)^H\right)\right|}{\|R_{e\!f\!f}\| \|D^H R D\|}$$

An expression on the right of an equal sign in the formula means searching the codebook $\Omega$ for a code word D that minimizes a value of $$\frac{\left|\operatorname{trace}\left(R_{e\!f\!f}(D^H R D)^H\right)\right|}{\|R_{e\!f\!f}\| \|D^H R D\|},$$

where trace( ) means calculating a trace of a matrix in the brackets.

Then, the second network device calculates an equivalent channel correlation matrix $\hat{R}_{e\!f\!f} = \hat{C}^H \hat{R} \hat{C}$ based on the estimated $\hat{C}$. The second network device determines, based on the received second reference signal and the equivalent channel correlation matrix, a rank r (Rank) and a code word W' that is in a codebook, that is corresponding to the rank r, and that represents a short-time narrowband channel characteristic, and feeds back a code word index of W' as the stage-2 precoding matrix indicator to the first network device. Optionally, the stage-2 precoding matrix indicator may be fed back to the first network device together with channel information such as an RI (rank indication) and/or a CQI (channel quality indicator).

On a basis of application of the adaptive codebook form $\hat{W} = \hat{R}_{e\!f\!f} W'$ that is based on the equivalent channel correlation matrix, the equivalent channel correlation matrix $\hat{R}_{e\!f\!f}$ is calculated or estimated, avoiding feeding back equivalent channel correlation matrix information. Therefore, performance of the two-stage precoding system is improved, and feedback overheads are also reduced.

In an example, the code word $\hat{C}$ in the stage-1 precoding codebook $\Omega$ may be of a non-block diagonal structure:

$$\hat{C} = [v_1, v_2, \ldots, v_s] \in \Omega, \text{ where}$$

$v_1$ to $v_s$ are column vectors in N×1 dimensions and are different from each other, and are selected from a predefined codebook that can be indicated by using a Q1-bit information element, for example, a DFT codebook, a Kronecker product codebook, or a codebook defined in the 3GPP TS 36.211 V13.1.0 protocol. This is not limited in this application. A code word in the stage-1 precoding codebook $\Omega$ may be indicated by using a Q1S-bit information element.

In another example, the code word $\hat{C}$ in the stage-1 precoding codebook $\Omega$ may be of a block diagonal structure:

$$\hat{C} = \begin{bmatrix} v_1 & & & \\ & v_2 & & \\ & & \ddots & \\ & & & v_S \end{bmatrix} \in \Omega,$$

where $v_1$ to $v_s$ are column vectors in (N/S)×1 dimensions and are selected from a predefined codebook that can be indicated by using a Q2-bit information element, for example, a DFT codebook, a Kronecker product codebook, or a codebook defined in the 3GPP TS 36.211 V13.1.0 protocol. This is not limited in this application. A code word in the stage-1 precoding codebook $\Omega$ may be indicated by using a Q2S-bit information element. Particularly, when $v_1 = v_2 = \ldots = v_s$, the code word in the stage-1 precoding codebook $\Omega$ may be indicated by using a Q2-bit information element.

Optionally, the first network device may indicate a type of the used stage-1 precoding codebook to the second network device by using 1-bit signaling. For example, '0' means using a codebook of the foregoing non-block diagonal structure, and '1' means using a codebook of the foregoing block diagonal structure.

The two-stage precoding method provided in this embodiment of this application may be applied to different hardware architectures by using the code word form of the stage-1 precoding codebook provided in this embodiment of this application, to improve performance of the two-stage precoding system by selecting a hardware architecture with better performance. For example, a codebook of the non-block diagonal structure may be applied to a DBF architecture or a fully connected HBF architecture, and a codebook of the block diagonal structure may be applied to a partially connected HBF architecture or the DBF architecture. Particularly, the codebook of the block diagonal structure may further support applying of this embodiment of this application to a distributed antenna system.

In part 507, the second network device feeds back the stage-2 precoding matrix indicator.

In an example, the second network device may feed back the stage-2 precoding matrix indicator by using existing signaling and an existing information element in a system. For example, in an LTE system, the stage-2 precoding matrix indicator may be used as a PMI and fed back by using a PUCCH (physical uplink control channel) and/or a PUSCH (physical uplink shared channel) according to a stipulation of 3GPP TS 36.211 V13.1.0, or signaling or an information element may be added to feed back the stage-2 precoding matrix indicator. This is not limited in this application.

In an example, the second network device may feed back only the stage-2 precoding matrix indicator, or may simultaneously feed back the stage-2 precoding matrix indicator and channel information such as an RI (rank indication) and/or a CQI (channel quality indicator). This is not limited in this application.

In part 508, the first network device determines a stage-2 precoding matrix based on the stage-2 precoding matrix indicator.

In an example, the first network device determines an equivalent channel correlation matrix $\hat{R}_{eff}=\hat{C}^H \hat{R} \hat{C}$ based on a code word $\hat{C}$ corresponding to the stage-1 precoding matrix and a code word $\hat{R}$ of a spatial correlation matrix, determines a code word W' based on the stage-2 precoding matrix indicator reported by the second network device, determines an adaptive code word of the second network device according to an adaptive codebook structure $\hat{W}=\hat{R}_{eff}W'$ ' that is based on the equivalent channel correlation matrix, and determines a final stage-2 precoding matrix based on adaptive code words of a plurality of second network devices. Optionally, the first network device may determine the stage-2 precoding matrix by using a conventional MU-MIMO (multi-user multiple-input multiple-output) technology that is based on equivalent channel information and that includes user scheduling and precoding algorithms such as a ZF (zero forcing) algorithm. The plurality of second network devices may be determined according to the user scheduling algorithm or another criterion. This is not limited in this application.

In another example, the first network device determines an equivalent channel correlation matrix $\hat{R}_{eff}=\hat{C}^H \hat{R} C$ based on a stage-1 precoding matrix C and a code word $\hat{R}$ of a spatial correlation matrix, determines a code word W' based on the stage-2 precoding matrix indicator reported by the second network device, determines an adaptive code word of the second network device according to an adaptive codebook structure $\hat{W}=\hat{R}_{eff}W'$ that is based on the equivalent channel correlation matrix, and determines a final stage-2 precoding matrix based on adaptive code words of a plurality of second network devices.

It should be noted that the embodiment provided in parts 505 to 508 may be independently applied to a system in which a channel correlation matrix needs to be fed back and a precoding matrix needs to be determined, and is not limited to joint usage with the stage-1 precoding determining method (that is, parts 501 to 504) provided in this embodiment of this application.

In part 509, the first network device performs precoding on downlink data by using the stage-1 precoding matrix and the stage-2 precoding matrix.

In part 510, the first network device sends, to the second network device, downlink data on which two-stage precoding is performed.

Figure 6:
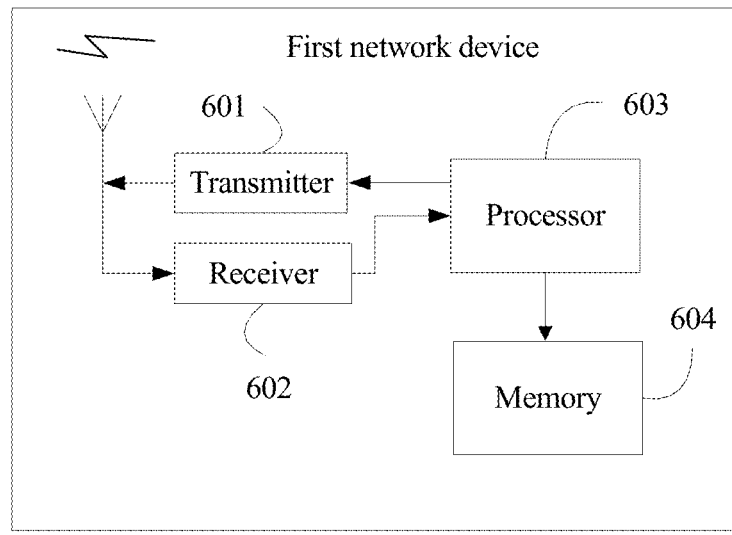
FIG. 6 is a schematic structural diagram of a first network device according to an embodiment of this application.

FIG. 6 shows a possible schematic structural diagram of the first network device according to the foregoing embodiment.

In an example, a structure of the first network device includes a transmitter, a receiver, and a processor. In another example, the structure of the first network device may further include an interface unit, configured to support communication between the first network device and another first network device, for example, communication between the first network device and a core network node. In the example corresponding to FIG. 6, the structure of the first network device in this application includes a transmitter 601, a receiver 602, a processor 603, and a memory 604.

The transmitter 601 and the receiver 602 are configured to support information receiving and sending between the first network device and the second network device described in the foregoing embodiment. The processor 603 implements various functions for communicating with the second network device. The processor 603 further executes processing processes related to the first network device in FIG. 4 and FIG. 5. The memory 604 is configured to store program code and data of the first network device.

It may be understood that FIG. 6 shows only a simplified design of the first network device. In actual application, the first network device may include any quantity of transmitters, receivers, processors, memories, and the like, and all first network devices that can implement this application fall within the protection scope of this application.

Optionally, the first network device may be a base station or another network side device that has a base station function.

Figure 7:
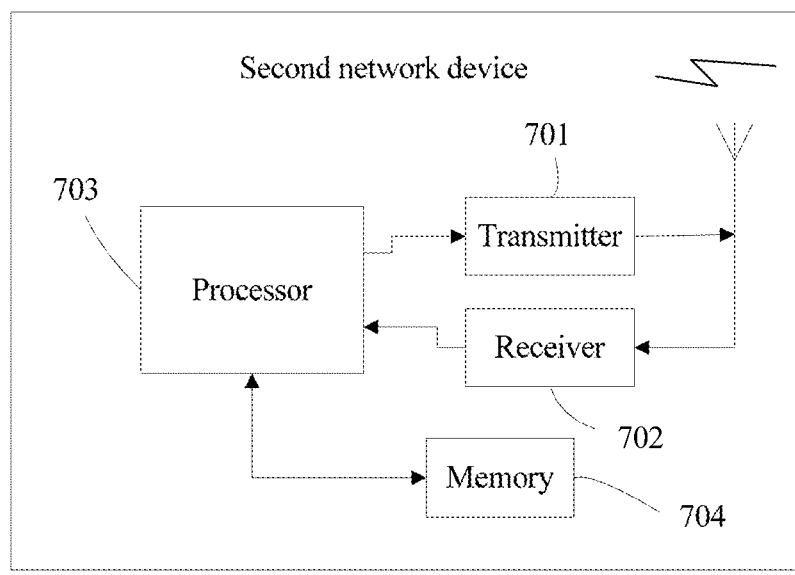
FIG. 7 is a schematic structural diagram of a second network device according to an embodiment of this application.

FIG. 7 shows a simplified schematic diagram of a possible design structure of the second network device according to the foregoing embodiment.

In an example, a structure of the second network device includes a transmitter, a receiver, and a processor. In the example corresponding to FIG. 7, the structure of the second network device in this application includes a transmitter 701, a receiver 702, a processor 703, and a memory 704.

On an uplink, a to-be-sent service or to-be-sent signaling data is processed by the transmitter 701 to generate an uplink signal, and the uplink signal is transmitted to the first network device in the foregoing embodiment by an antenna. On a downlink, the antenna receives a downlink signal transmitted by the first network device in the foregoing embodiment, and the receiver 702 processes the signal received from the antenna and sends the signal to another device or module, for example, the processor that needs to perform further processing on the signal. The processor 703 processes service data and a signaling message. These units perform processing according to a radio access technology (such as an access technology in LTE or another evolved system) used by a radio access network. The processor 703 is further configured to control and manage an action of the second network device, and configured to perform processing that is performed by the second network device in the foregoing embodiment, for example, configured to: control the second network device to receive downlink information and/or perform, based on the received downlink information, another process of a technology described in this application. The processor 703 is configured to support the second network device in executing processing processes related to the second network device in FIG. 4 and FIG. 5. The memory 704 is configured to store program code and data used by the second network device.

Optionally, the second network device may be user equipment.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in the first network device or the second network device. Certainly, the processor and the storage medium may exist in the first network device or the second network device as discrete components. Optionally, some or all of steps in the method or the algorithm described in this application, for example, all steps except sending and receiving steps, may be further implemented by using a chip system. The chip system includes at least one chip. Optionally, the chip system may further include another discrete component.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement, or improvement made based on the technical solutions of this application shall fall within the protection scope of this application.

What is claimed is:

1. A two-stage precoding method, comprising:
receiving, by a second device, a first reference signal from a first device;
estimating, by the second device, spatial correlation matrix information based on the received first reference signal;
sending, by the second device, the spatial correlation matrix information to the first device, wherein the spatial correlation matrix information is for determining a stage-1 precoding matrix in a two-stage precoding;
receiving, by the second device and from the first device, a second reference signal that is encoded by using the stage-1 precoding matrix;
determining, by the second device, a stage-2 precoding matrix indicator based on the second reference signal; and
sending, by the second device, the stage-2 precoding matrix indicator to the first device.

2. The method according to claim 1, wherein the spatial correlation matrix information comprises:
a code word index of a first codebook and a code word index of a second codebook; or
a code word index of a spatial correlation matrix.

3. The method according to claim 2, wherein a code word $\hat{R}_1$ in the first codebook meets $\hat{R}_1 = U(\rho_1, n_1)$, and $$U(\rho_1, n_1) = \begin{bmatrix} 1 & \rho_1 & \cdots & \rho_1^{n_1-1} \\ \rho_1^* & 1 & & \rho_1^{n_1-2} \\ \vdots & \vdots & \ddots & \vdots \\ (\rho_1^*)^{n_1-1} & (\rho_1^*)^{n_1-2} & \cdots & 1 \end{bmatrix},$$

wherein
$\rho_1 = \alpha_1 e^{j\theta_1}$, $(0 \leq \alpha_1 \leq 1, 0 \leq \theta_1 < 2\pi)$ represents a correlation coefficient of adjacent antenna elements in a single polarization antenna array in an antenna array, $n_1$ is a quantity of antenna elements in the single polarization antenna array, and the single polarization antenna array comprises antenna elements that are in a same row or a same column of the antenna array and that are in a same polarization direction.

4. The method according to claim 2, wherein a code word $\hat{R}_2$ in the second codebook meets:

$$\hat{R}_2 = \begin{bmatrix} U(\rho_2, n_2) & \beta_1 e^{j\phi_1} U(\rho_2, n_2) \\ \beta_1 e^{-j\phi_1} U(\rho_2, n_2) & \beta_2 U(\rho_2, n_2) \end{bmatrix},$$

wherein $$U(\rho_2, n_2) = \begin{bmatrix} 1 & \rho_2 & \cdots & \rho_2^{n_2-1} \\ \rho_2^* & 1 & & \rho_2^{n_2-2} \\ \vdots & \vdots & \ddots & \vdots \\ (\rho_2^*)^{n_2-1} & (\rho_2^*)^{n_2-2} & \cdots & 1 \end{bmatrix},$$

wherein
$\rho_2 = \alpha_2 e^{j\theta_2}$, $(0 \leq \alpha_2 \leq 1, 0 \leq \theta_2 < 2\pi)$ represents a correlation coefficient of adjacent co-polarized antenna elements in a cross polarization antenna array in the antenna array, $\beta_1$, $\phi_1$, and $\beta_2$ represent correlation between antenna elements in two polarization directions, wherein $\beta_1 \geq 0$, $0 \leq \phi_1 < 2\pi$, and $\beta_2 > 0$, $n_2$ is a quantity of antenna elements in a same polarization direction in the cross polarization antenna array, and the cross polarization antenna array comprises antenna elements that are in a same row or a same column of the antenna array and that are in two polarization directions.

5. The method according to claim 1, further comprising:
receiving, by the second device and from the first device, a code word index that corresponds to the stage-1 precoding matrix in a stage-1 precoding codebook;
determining, by the second device and based on the code word index corresponding to the stage-1 precoding matrix in the stage-1 precoding codebook, a code word corresponding to the stage-1 precoding matrix in the stage-1 precoding codebook; and
determining, by the second device, the stage-2 precoding matrix indicator based on the second reference signal and the code word corresponding to the stage-1 precoding matrix in the stage-1 precoding codebook.

6. The method according to claim 1, further comprising:
estimating, by the second device, a code word corresponding to the stage-1 precoding matrix in a stage-1 precoding codebook; and
determining, by the second device, the stage-2 precoding matrix indicator based on the second reference signal and the estimated code word corresponding to the stage-1 precoding matrix in the stage-1 precoding codebook.

7. The method according to claim 5, wherein a code word $\hat{C}$ in the stage-1 precoding codebook meets:

$\hat{C} = [v_1, v_2, \ldots, v_s]$, wherein $v_1$ to $v_s$ are column vectors in N×1 dimensions and are different from each other; or $$\hat{C} = \begin{bmatrix} v_1 & & & \\ & v_2 & & \\ & & \ddots & \\ & & & v_S \end{bmatrix},$$

wherein
$v_1$ to $v_s$ are column vectors in (N/S)×1 dimensions, where N is a quantity of antenna elements in an antenna array, S is a quantity of antenna ports, and S≤N.

8. The method according to claim 1, wherein a feedback period of the spatial correlation matrix information is greater than a feedback period of the stage-2 precoding matrix indicator.

9. A device, comprising:
a transmitter, the transmitter configured to send a first reference signal to a second device, wherein the first reference signal is for estimating spatial correlation matrix information;
a receiver, the receiver configured to receive spatial correlation matrix information from the second device; and
a processor, the processor configured to determine a stage-1 precoding matrix in a two-stage precoding based on the spatial correlation matrix information, wherein:
the transmitter is further configured to send a second reference signal encoded by using the stage-1 precoding matrix, wherein the second reference signal is for determining a stage-2 precoding matrix indicator;
the receiver is further configured to receive a stage-2 precoding matrix indicator from the second device; and
the processor is further configured to determine a stage-2 precoding matrix based on the received stage-2 precoding matrix indicator, and perform two-stage precoding on data by using the stage-1 precoding matrix and the stage-2 precoding matrix.

10. The device according to claim 9, wherein the spatial correlation matrix information comprises:
a code word index of a first codebook and a code word index of a second codebook; or
a code word index of a spatial correlation matrix.

11. The device according to claim 9, wherein:
the processor is further configured to determine a code word corresponding to the stage-1 precoding matrix in a stage-1 precoding codebook; and
the transmitter is further configured to send a code word index corresponding to the stage-1 precoding matrix to the second device.

12. The device according to claim 9, wherein a feedback period of the spatial correlation matrix information is greater than a feedback period of the stage-2 precoding matrix indicator.

13. A device, comprising:
a receiver, the receiver configured to receive a first reference signal from a first device;
a processor, the processor configured to estimate spatial correlation matrix information based on the received first reference signal; and
a transmitter, the transmitter configured to send the spatial correlation matrix information to the first device, wherein the spatial correlation matrix information is for determining a stage-1 precoding matrix in a two-stage precoding, wherein:
the receiver is further configured to receive, from the first device, a second reference signal that is encoded by using the stage-1 precoding matrix;
the processor is further configured to determine a stage-2 precoding matrix indicator based on the second reference signal; and
the transmitter is further configured to send the stage-2 precoding matrix indicator to the first device.

14. The device according to claim 13, wherein the spatial correlation matrix information comprises:
a code word index of a first codebook and a code word index of a second codebook; or
a code word index of a spatial correlation matrix.

15. The device according to claim 13, wherein:
the receiver is further configured to receive, from the first device, a code word index that corresponds to the stage-1 precoding matrix in a stage-1 precoding codebook; and
the processor is further configured to:
determine, based on the code word index corresponding to the stage-1 precoding matrix in the stage-1 precoding codebook, a code word corresponding to the stage-1 precoding matrix in the stage-1 precoding codebook; and
determine the stage-2 precoding matrix indicator based on the second reference signal and the code word corresponding to the stage-1 precoding matrix in the stage-1 precoding codebook.

16. The device according to claim 13, wherein the processor is further configured to:
estimate a code word corresponding to the stage-1 precoding matrix in a stage-1 precoding codebook; and
determine the stage-2 precoding matrix indicator based on the second reference signal and the estimated code word corresponding to the stage-1 precoding matrix in the stage-1 precoding codebook.

17. The device according to claim 13, wherein a feedback period of the spatial correlation matrix information is greater than a feedback period of the stage-2 precoding matrix indicator.

* * * * *

UNITED STATES PATENT AND TRADEMARK OFFICE
CERTIFICATE OF CORRECTION

PATENT NO. : 10,630,353 B2
APPLICATION NO. : 16/186831
DATED : April 21, 2020
INVENTOR(S) : Lu Wu and Yi Huang Page 1 of 1

It is certified that error appears in the above-identified patent and that said Letters Patent is hereby corrected as shown below:

In the Claims

In Column 27, Line 9, in Claim 7, delete "where" and insert -- wherein --, therefor.

Signed and Sealed this
Sixteenth Day of June, 2020

Andrei Iancu
*Director of the United States Patent and Trademark Office*